United States Patent [19]

Fletcher

[11] 4,337,373

[45] Jun. 29, 1982

[54] FURNACE FOR FUSING VANADIUM PENTOXIDE POWDER

[75] Inventor: Michael B. Fletcher, Pretoria, South Africa

[73] Assignee: Union Carbide Corporation, Danbury, Conn.

[21] Appl. No.: 113,098

[22] Filed: Jan. 17, 1980

[30] Foreign Application Priority Data

Jan. 22, 1979 [ZA] South Africa .................. 79/0247

[51] Int. Cl.³ .............................................. H05B 3/60
[52] U.S. Cl. ................................. 373/120; 373/115; 373/135; 75/10 R; 75/11; 75/65 R
[58] Field of Search .................... 13/6, 23, 20, 24, 33; 75/10 R, 11, 65 R

[56] References Cited

U.S. PATENT DOCUMENTS

| 2,677,003 | 4/1954 | Arbeit et al. | 13/6 X |
| 2,975,224 | 3/1961 | Burch | 13/6 X |
| 4,011,430 | 3/1977 | Witkin et al. | 13/24 X |
| 4,161,617 | 7/1979 | Hrycik et al. | 13/6 |
| 4,246,432 | 1/1981 | Rinkes et al. | 13/6 |

Primary Examiner—Roy N. Envall, Jr.
Attorney, Agent, or Firm—John R. Doherty

[57] ABSTRACT

In the fusion of vanadium pentoxide powder heat is generated in a melt of the powder by passing an electrical current along a current path in the melt and additional vanadium pentoxide powder is fed onto the surface of the melt. A furnace is used which has an overflow weir.

15 Claims, 5 Drawing Figures

FURNACE FOR FUSING VANADIUM PENTOXIDE POWDER

This invention relates to a method of fusing vandium pentoxide powder. It relates also to a furnace for carrying out the method.

In presently available resistance heating electric furnaces, which are used for fusing such powder, the power consumption is high and the refractory lining and resistance heating elements also do not last long.

It is an object of this invention to provide a furnace which has advantages over presently available furnaces.

According to the invention, in the fusion of vanadium pentoxide powder, there is provided a method of generating heat in a melt of the powder, which includes the steps of passing an electrical current along an electrical current path in the melt, and of feeding addition vanadium pentoxide powder onto the surface of the melt.

The melt may be contained in a bath, and excess melt may be allowed to flow out of the bath over an overflow weir. The additional powder which is fed may take the form of a layer on the surface of the melt. The feeding of the powder may take place in a zone separated from the weir by a baffle projecting downwardly into the melt. The layer of the powder in the said zone may be of such a depth as to form an insulating blanket, thereby to limit the temperature of the air above the layer.

The electrical current path may extend between electrodes submerged in the melt. The current path may first be established by providing a localized melt of powder by means of an external heat source, such as an oxyacetylene flame. The electrical power input to the furnace may be maintained substantially constant, and the temperature of the melt is maintained within determined limits by controlling the rate of feed of powder onto the surface of the melt. The temperature limits of the melt may lie within the range from 700° C. to 820° C., but are preferably from 720° C. to 800° C. The rate of feed of powder may also be controlled to maintain a depth of flow of melt over the weir within predetermined limits.

By way of an override control, the feeding of powder may be initiated when the air temperature above the layer of powder on the surface of the melt rises beyond a predetermined maximum value. The predetermined maximum value of the temperature may be about 200° C., but is preferably 100° C.

The invention extends also to a furnace comprising a furnace body defined by walls extending upwardly from a bottom and adapted to contain a melt and having electrode ports extending downwardly at a slope through its walls, and having an overflow weir leading out of the body; and a removable cover adapted to seat on the furnace body and having a feeding opening through which a particulate material may be fed into the melt when the furnace is in use.

The furnace may include a baffle projecting downwardly to a level below the level of the overflow weir, but clear of the bottom of the furnace body. The baffle may be disposed between the electrode ports on the one hand and the weir on the other hand. The baffle may be in the form of a plurality of refractory bricks threaded onto a transverse bar supported on opposite sides by the walls of the furnace body. The feed opening in the cover may be disposed on that side of the baffle remote from the weir.

More particularly, a furnace according to the invention includes electrodes in the form of rods extending downwardly through the electrode ports into the furnace body to a level below the level of the weir but clear of the bottom of the furnace body, the electrodes having connecting means adapted for connection to a source of electrical power; and feed means operatively mounted in relation to the feed opening in the cover, the feed means being adapted in operation to feed particulate material into the melt.

The electrodes may be arranged in at least three pairs in opposed relationship for three-phase connection, the electrodes for each phase being disposed oppositely to each other.

There may be provided a furnace installation, including a furnace as described, power supply means adapted to supply power to the electrodes, and melt temperature sensing means adapted to sense the temperature of the melt and to provide a signal in response to variations of the melt temperature beyond predetermined maximum and minimum values. The power supply means may be adapted to supply constant power to the electrodes.

The installation may also include feed control means responsive to a signal from the melt temperature sensing means to control the melt temperature within predetermined limits by controlling the rate of feed of particulate material onto the surface of the melt or power control means may be provided, adapted to control the supply of power to the electrodes in response to the said signal from the melt temperature sensing means so as to maintain the melt temperature within predetermined limits.

In addition, the installation may include air temperature sensing means on that side of the baffle remote from the weir and at a level above the level of the weir, and adapted to sense the temperature of the air above the layer of power on the surface of the melt and to provide a signal in response to a rise in the air temperature above a predetermined maximum value. The feed control means may be adapted to control the feed of particulate material in response to the said signal from the air temperature sensing means by energizing the feed means to feed more particulate material for a predetermined period or until the sensed air temperature falls below a predetermined value, whereupon it de-energizes the feed means to stop feeding the particulate material.

If desired the furnace installation may include melt level sensing means adapted to sense the level of the melt in the furnace body and adapted to provide a signal when the level of the melt falls below a predetermined level above the level of the weir. The feed control means may, alternatively or in addition, be adapted to control the feed of particulate material in response to the said signal from the melt level sensing means such that the depth of flow or melt over the weir is maintained within predetermined limits by energizing the feed means when the level of the melt falls below a predetermined level above the level of the weir, and by de-energizing the feed means to stop the feed of the material when the level of the melt rises beyond a predetermined level.

The power supply means may include a transformer having a primary side adapted for connection to a three-phase power supply, and having a secondary coil for each phase connected in series with its own pair of electrodes and with a thyristor; and the power control means may include thyristor control means operatively connected to the thyristors to limit the electrode current drawn per phase. The power control means may be adapted in operation to maintain the three-phase power input substantially constant.

In the fusion of vanadium pentoxide powder, the invention extends also to a method of limiting the temperature of the interior surface of the furnace to a value below 1000° C., by generating heat internally within a melt of the powder in the furnace, by passing an electrical current along an electrical current path within the melt, and by feeding vanadium pentoxide powder onto the surface of the melt to provide an insulating blanket of predetermined thickness, on the surface of the melt.

The invention will now be described by way of example with reference to the accompanying diagrammatic drawings.

Figure 1:
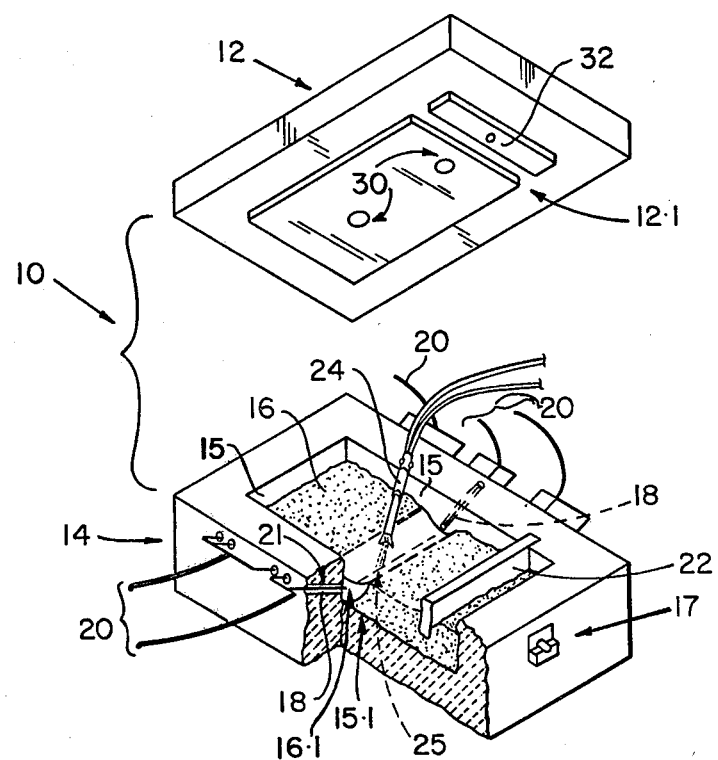
FIG. 1 shows a part-sectional three-dimensional view of a furnace according to the invention, with the cover off.

Referring to the drawings, reference numeral 10 refers generally to a furnace comprising a removable cover 12 and a body 14 having walls 15 extending upwardly from a bottom 15.1. The body 14 is adapted to contain a charge of vanadium pentoxide powder 16. The body 14 also has spaced sets of electrodes 18 having connecting means in the form of electrical supply terminals 20. The electrodes pass through ports 21 in the walls 15 of the furnace. The ends of the electrodes 18 are submerged in the powder 16. The bath 14 has a weir 17 to permit the outflow of molten vanadium pentoxide powder when the melt in the furnace reaches the level of the weir. A baffle 22 is provided upstream of the weir 17 to provide a draw-off zone of quietness for flow over the weir during operation and when the powder 16 has melted. The upper edge of the baffle 22 fits into the recess 12.1 on the underside of the cover 12.

In order to start the operation, powder in the zone 16.1 between the opposed electrodes 18, is melted by means of an oxyacetylene torch 24 or an equivalent source of heat. Once the vanadium pentoxide powder has melted it becomes conductive and an electrical current path 25 is established between the electrodes. As soon as an electrical current path has been established, then the cover 12 is lowered sealingly onto the rim of the furnace body and current is passed between the electrodes along the newly established current path 25. As current continues to flow along that path, more melting of the powder takes place and additional current paths are established between the remaining electrodes.

Figure 2:
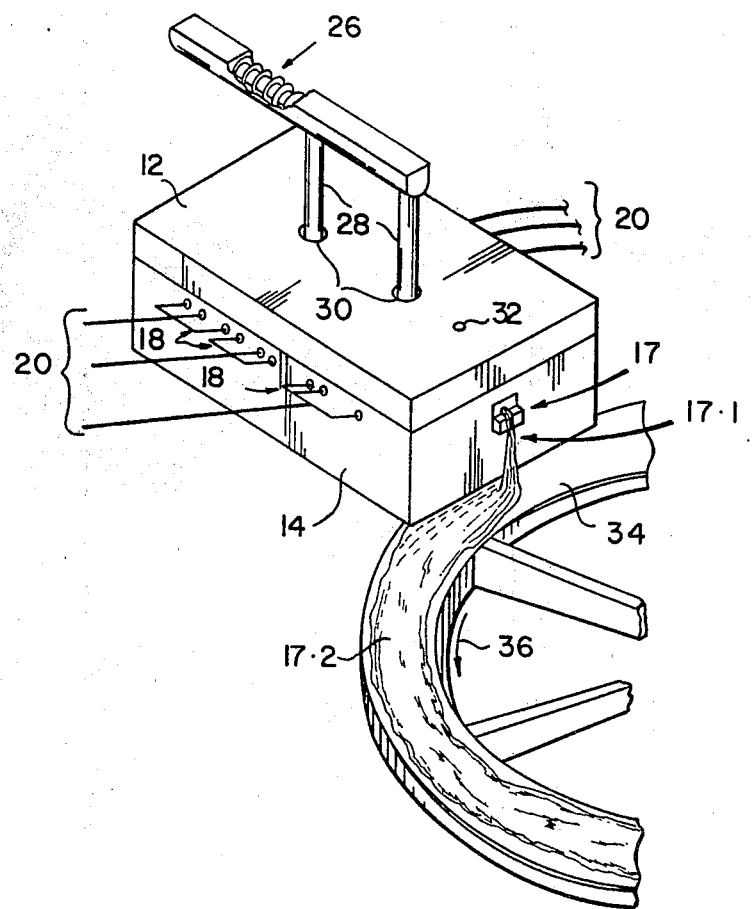
FIG. 2 shows an oblique end view of the furnace of FIG. 1, in operation.

As the powder melts, additional powder is added until the level in the bath rises to permit bleeding off of molten vanadium pentoxide over the weir, as indicated at 17.1 in FIG. 2 of the drawings. Additional vanadium pentoxide powder is fed into the furnace by means of the screw conveyor 26 feeding into the chutes 28 and thence into the furnace via the feed openings 30. The cover is further provided with a vent hole 32 to prevent build-up of pressure inside the furnace. The vanadium pentoxide in liquid form overflows the weir 17 in a stream 17.1 which is then taken up in the form of a ribbon 17.2 on the rim 34 of a casting wheel rotating in the direction of arrow 36.

Figure 3:
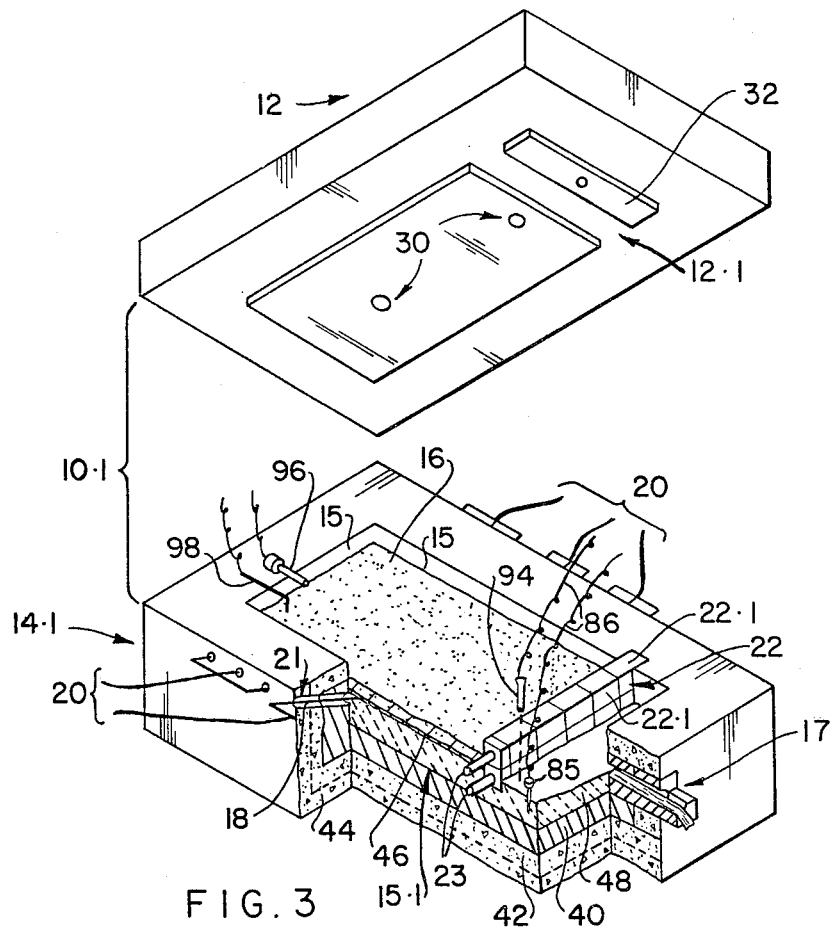
FIG. 3 shows a view similar to FIG. 1 but of a developed embodiment.
Figure 4:
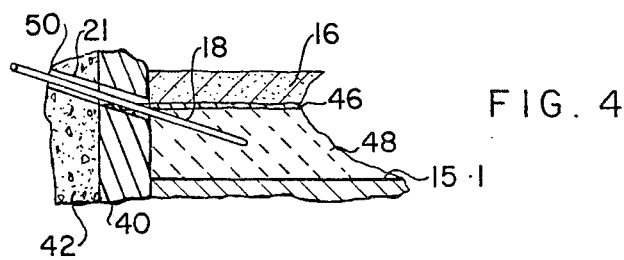
FIG. 4 shows a transverse part-sectional elevation through an electrode and electrode port.

Referring now to FIGS. 3 and 4 of the drawings, there is shown an embodiment of a furnace according to the invention 10.1 which is generally of the same construction as that shown in FIGS. 1 and 2 of the drawings. It contains however certain refinements. Thus, the furnace has an inner lining 40 of silicon carbide, then follows an intermediate layer of 42 of a castable refractory (Refcast 50-monolithic) and then an outer layer 44 of another castable refractory (Lincast LO-6). The outer layer 44 may itself be supported in a frame, or supporting brickwork if desired.

The baffle 22 is made up of a plurality of refractory bricks 22.1 threaded onto transverse rods 23 supported oppositely by the walls 15 of the bath 14.1. As in the previous embodiment, feeding takes place by means of a screw conveyor 26 (not shown in this embodiment) via openings 30 to the feed zone of the bath upstream of the baffle 22. The vanadium pentoxide powder 16 forms an upper layer. A crust 46 forms immediately under the layer of powder 16, and the melt 48 lies underneath the crust 46. The electrodes 18 project downwardly through the ports 21 in the walls of the furnace. The clearance spaces around the electrodes 18 in the ports 21, are packed with insulating wool.

Figure 5:
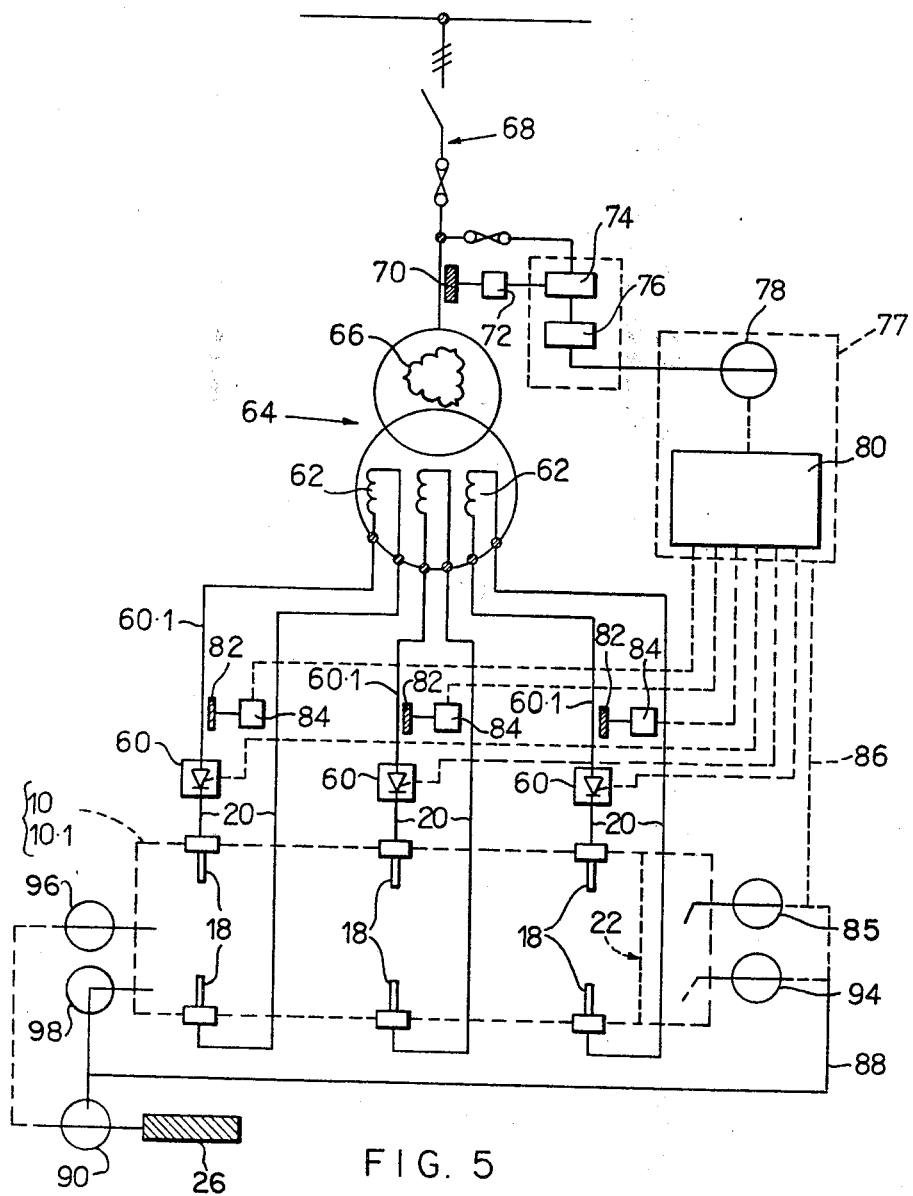
FIG. 5 shows a schematic diagram of the electrical circuitry of the embodiment of FIG. 3.

Referring now also to FIG. 5 of the drawings, there is shown a schematic diagram of the electrical circuitry of a furnace installation embodying the embodiment of FIGS. 3 and 4 of the drawings. A pair of electrodes 18 are connected in series with each other and with a thyristor 60, in series with the secondary coil 62 of each phase of a three-phase transformer generally indicated by reference numeral 64. The primary coils 66 of the transformer, are connected in delta configuration and are fed by three lines 68, although only one is shown.

Each line is supplied with a current transformer 70 connected via an ammeter 72 to a kilowatt hour meter 74 intended to measure the total power input over a period of time. A kilowatt power indicator 76, is intended to show the instantaneous power input to the three phases of the transformer 64 at any instant. The kilowatt power indicator 76, is connected to power control means 77 comprising a kilowatt transducer 78 and a thyristor controller 80 which receives an output control signal from the transducer 78. The thyristors 60, are connected individually to the thyristor controller 80. In addition, the current flowing in the line 60.1 leading to each thyristor, is measured by a current transformer 82 and ammeter 84. The ammeter of each phase is connected to the thyristor controller 80.

The furnace installation is further provided with melt temperature sensing means 85 adapted to sense the temperature of the melt, preferably at or near the weir. This melt power control means 77 which is adapted to control the supply of power to the electrodes 18 in response to the sensed temperature of the melt, to maintain such temperature within predetermined limits.

In operation, the power control means 77 will maintain the three-phase power input at a more or less constant optimum level while the thyristor controller 80 will automatically vary the voltage and hence the current in each phase, in response to the changing impedance of the melt. The high and low values of temperature sensed by the melt temperature sensing means 85 will act as reference. In operation, the melt will be maintained in a temperature range of from about 720° C. to 800° C.

There is, however, an override control to limit the current flowing between a pair of electrodes so as not to exceed a predetermined maximum for the electrodes. Such protection is achieved by the current measured by the current transformers 82 and ammeters 84, the values of such currents being fed into the power control means 77 to limit such current. The limiting of the current in one phase, will reduce the three-phase power input to below the predetermined optimum and the power control means 77 will therefore have a tendency to increase the voltage on the other two phases, thereby to bring the power input up to the optimum again. Eventually a state of substantial equilibrium will be achieved in the power demands of the various phases. In other words, the loads on the various phases will be more or less in balance.

Apart from the control of temperature by means of the power control means, a certain measure of control may also be exercised by feeding powder onto the surface of the melt. This may be achieved by having the melt temperature sensing means 85 connected via conductors 88 to feed control means 90 controlling the operation of the feed means 92.

Additionally, the furnace installation, has melt level sensing means 94 connected via conductors 88 to feed control means 90, controlling the feed means 26. The melt level sensing means 94 and the feed control means 26, will together operate to control the feed of the powder, such that the depth of flow of melt over the weir 17 is maintained within predetermined limits. Thus if the depth of flow over the weir is too small, then the feed means will be energized to feed more powder. Conversely, when the depth of flow over the weir is too large, then the feed control means 90 will de-energize the feed means 26 so as to stop the feed of powder.

The furnace installation comprises further air temperature sensing means 96 on the feed zone side of the baffle 22. It is situated at a level above the level of the weir 17 and is adapted to sense the temperature of the air above the layer 16 of powder on the surface of the melt. It is adapted to co-operate with the feed control means 90, to control the feed of powder such that when the sensed air temperature inside the furnace exceeds a predetermine value, it energises the feed means 26s to feed more particulate material for a determined period e.g. one minute, or until the sensed air temperature falls below a predetermined value whereupon it de-energizes the feed means to stop feeding the powder.

The furnace installation may further include a powder layer thickness sensing means 98 adapted to co-operate with the feed control means 90, to de-energise the feed means, when the layer of the powder on the melt, exceeds a predetermined thickness, e.g. say, 70 or 80 mm. Instead of automatic operation, one or more of the various sensing means 85, 94, 96, 98 may be made to provide signals merely, upon which operators can act to take the necessary remedial measures. The electrodes must be of material which is resistant to high temperatures. Different materials become economic as prices change. There are a number of materials which are technically useful. The electrodes may be made of tungsten, high temperature resistant stainless steel, nickel, silicon carbide, molybdenum, tungsten carbide, tantalum, zirconium, and the like.

In operation, the temperature of the inside of the furnace is kept to a temperature well below the melting point of the vanadium pentoxide (675° C.). The inner surface of the refractory material is therefore protected by a frozen skin of vanadium pentoxide formed by the unheated powder falling onto the surface of the melt. This ensures that the refractory lining is protected from the strong catalytic oxygen releasing reactive effect of the molten vanadium pentoxide.

Once the powder in the bath has melted, the feeding of powder into the top of the furnace provides a frozen crust on top of the melt. The crust together with a layer of powder on the crust shields the air space in the furnace and hence the inner surface of the furnace from the high temperature of the melt.

Inasmuch as the heat of fusion is generated internally within the furnace body, at zones sufficiently removed from the refractory materials, the refractory materials are therefore not subjected to such high temperatures as with conventional furnaces known to the applicants, making use of radiant heating electrodes. If desired, each of the electrodes may be watercooled so that only the inner end is submerged in the melt and is electrically active.

With radiant furnaces, the refractory materials used must be capable of withstanding temperatures of up to 1800° C. whereas in a furnace as described, the inner wall face of the refractory material in the furnace can be limited to a temperature of between 500° C. and 700° C. or even lower. This is therefore a much lower temperature and results in a much increased life of the refractory lining. No hard and fast rules regarding temperature can be laid down because the temperature of the inner wall of the furnace will depend upon how the operator chooses to operate the furnace.

Additionally, silicon carbide radiant heating elements known to the applicants as being used in radiant furnaces heretofore, are very sensitive to thermal shock and cracking if vanadium pentoxide powder fluidises, melts, and short circuits through the air between adjacent electrodes. Such silicon carbide electrodes are also very expensive and have only a limited life, which is much shorter than the tungsten electrodes of a furnace according to the instand invention.

A furnace according to the present invention will need less power than that needed by conventional furnaces of equivalent capacity. This invention makes use of the property of vanadium pentoxide that when in molten form, it is electrically conductive although it may not be so while in powder form.

The start-up procedure has been described above as including the use of an oxyacetylene flame to melt the powder so as to provide the initial current path. This start-up procedure is not limited to the use of such heating means. Any convenient heating procedure, such as resistance heating of a submerged element, or liquid fuel flame heating may be used. If molten vanadium pentoxide is available from another furnace, then such molten vanadium pentoxide may be ladled into the bath of the present furnace to provide the initial current path.

If desired, the vent 32 may be connected to an exhaust duct so as to maintain a slight negative pressure, i.e. below ambient atmospheric pressure, within the furnace.

What is claimed is:

1. A furnace comprising a body defined by walls extending upwardly from a bottom and adapted to contain an electrically conductive melt and having electrode ports extending downwardly at a slope through its walls, and having an overflow weir leading out of the body; a removable cover adapted to seat on the body and having a feed opening through which a particulate material may be fed into the body when the furnace is in operation; electrode rods extending downwardly through the electrode ports into the melt to a level below the level of the weir but clear of the bottom of the body; a power supply and means for electrically connecting said electrode rods to said power supply, the power supply being adapted to supply a substantially constant power to the electrode rods; feed means operatively mounted in relation to the feed opening in the cover, the feed means being adapted in operation to feed particulate material into the body; melt temperature sensing means adapted to sense the temperature of the melt and to provide a signal in response to variations of the melt temperature beyond a predetermined maximum or minimum value; and feed control means responsive to the signal from the melt temperature sensing means to automatically adjust the melt temperature within predetermined limits by controlling the rate of feed of particulate material onto the surface of the melt.

2. A furnace as claimed in claim 1, which includes a baffle projecting downwardly to a level below the level of the overflow weir, but clear of the bottom of the bath.

3. A furnace as claimed in claim 2, in which the baffle is disposed between the electrode ports on the one hand and the weir on the other hand.

4. A furnace as claimed in claim 2, in which the baffle is in the form of a plurality of refractory bricks threaded onto a transverse bar supported on opposite sides by the walls of the bath.

5. A furnace as claimed in claim 2, 3 or 4 in which the feed opening in the cover is disposed on that side of the baffle remote from the weir.

6. A furnace as claimed in claim 1, in which the electrode rods are arranged in at least three pairs in opposed relationship for three-phase connection, the pair of electrodes for each phase being disposed oppositely to each other.

7. A furnace as claimed in claim 1 which includes power control means adapted to control the supply of power to the electrode rods in response to a signal from the melt temperature sensing means to maintain the melt temperature within predetermined limits.

8. A furnace as claimed in claim 2, which includes air temperature sensing means on that side of the baffle remote from the weir and at a level above the level of the weir and adapted to sense the temperature of the air above the layer of particulate material on the surface of the melt and to provide a signal in response to the rise in air temperature above a predetermined maximum value.

9. A furnace as claimed in claim 8 which includes feed control means adapted to control the feed of particulate material in response to a signal from the air temperature sensing means by energizing the feed means to feed more particulate material for a predetermined period or until the sensed air temperature falls below a predetermined value, whereupon it de-energizes the feed means to stop feeding the particulate material.

10. A furnace as claimed in claim 2, which includes melt level sensing means adapted to sense the level of the melt in the body and adapted to provide a signal when the level of the melt in the body falls below a predetermined level above the level of the weir.

11. A furnace as claimed in claim 10 which includes feed control means adapted to control the feed of particulate material in response to a signal from the melt level sensing means such that the rate of flow of melt over the weir is maintained within predetermined limits by energizing the feed means when the level of the melt falls below a predetermined level above the level of the weir, and by de-energizing the feed means to stop the feed of the material when the level of the melt rises beyond a predetermined level above the level of the weir.

12. A furnace as claimed in claim 2, in which the power supply means includes a transformer having a primary side adapted for connection to a three-phase power supply, and having a secondary coil for each phase connected in series with its own pair of electrodes and with a thyristor; and in which the power control means includes thyristor control means operatively connected to the thyristors to limit the electrode current drawn per phase.

13. A furnace as claimed in claim 1, and in which the power control means is adapted in operation to maintain the three phase power input substantially constant.

14. A furnace comprising a body defined by walls extending upwardly from a bottom and adapted to contain an electrically conductive melt and having electrode ports extending downwardly at a slope through its walls, and having an overflow weir leading out of the body; a removable cover adapted to seat on the body and having a feed opening through which a particulate material may be fed into the body when the furnace is in operation; electrode rods extending downwardly through the electrode ports into the body to a level below the level of the weir but clear of the bottom of the body; a power supply and means for electrically connecting the electrode rods to said power supply, the power supply being adapted to supply substantially constant power to the electrode rods; feed means operatively mounted in relation to the feed opening in the cover, the feed means being adapted in operation to feed particulate material into the body; melt temperature sensing means adapted to sense the temperature of the melt and to provide a first signal in response to variations of the melt temperature beyond a predetermined maximum or minimum value; air temperature sensing means located at a level above the level of the weir and adapted to sense the temperature of the air above the layer of particulate material on the surface of the melt and to provide a second signal in response to a rise in air temperature above a predetermined maximum value; and feed control means adapted to control the feed of particulate material in response to said first and second signals whereby the temperature of the melt and air temperature above the layer of particulate material are automatically adjusted to within respective predetermined limits by controlling the rate of feed of the particulate material onto the surface of the melt.

15. A furnace comprising a body defined by walls extending upwardly from a bottom and adapted to contain an electrically conductive melt and having electrode ports extending downwardly at a slope through its walls, and having an overflow weir leading out of the body; a removable cover adapted to seat on the body and having a feed opening through which a particulate material may be fed into the body when the furnace is in operation; electrode rods extending downwardly through the electrode ports into the body to a level below the level of the weir but clear of the bottom of the body; a power supply and means for electrically connecting said electrode rods to said power supply, the power supply being adapted to supply substantially constant power to the electrode rods; feed means operatively mounted in relation to the feed opening in the cover, the feed means being adapted in operation to feed particulate material into the body; melt temperature sensing means adapted to sense the temperature of the melt and to provide a first signal in response to variations in the melt temperature beyond a predetermined maximum or minimum value; and air temperature sensing means located at a level above the level of the weir and adapted to sense the temperature of the air above the layer of particulate material on the surface of the melt and to provide a second signal in response to a rise in air temperature above a predetermined maximum value; melt level sensing means adapted to sense the level of the melt in the body and adapted to provide a third signal when the level of the melt in the body falls below a predetermined level above the level of the weir; and feed control means adapted to control the feed of particulate material in response to said first, second or third signals whereby the temperature of the melt, air temperature or melt level are automatically adjusted to within respective predetermined limits by controlling the rate of feed of the particulate material onto the surface of the melt.

* * * * *

UNITED STATES PATENT AND TRADEMARK OFFICE
CERTIFICATE OF CORRECTION

PATENT NO. : 4,337,373
DATED : June 29, 1982
INVENTOR(S) : Michael B. Fletcher

It is certified that error appears in the above—identified patent and that said Letters Patent is hereby corrected as shown below:

Col. 3, line 39 - "bath" should read -- body --.

Col. 3, line 62 - "bath" should read -- furnace body --.

Col. 5, line 48 - "energises" should be -- energizes --.

line 54 - "de-energise" should be -- de-energize --.

Col. 6, line 10 - word "continuous" should be inserted before "feeding".

Col. 7, line 27 (claim 2) - "bath" should read -- body --.

Col. 7, line 34 (claim 4) - "bath" should read -- body --.

Signed and Sealed this

Fifteenth Day of February 1983

[SEAL]

Attest:

GERALD J. MOSSINGHOFF

Attesting Officer

Commissioner of Patents and Trademarks